United States Patent
Anders et al.

(10) Patent No.: US 10,606,937 B2
(45) Date of Patent: Mar. 31, 2020

(54) DYNAMIC CONTRIBUTION MAPPING OF DIGITAL WORKS

(71) Applicant: INTERNATIONAL BUSINESS MACHINES CORPORATION, Armonk, NY (US)

(72) Inventors: Kelley L. Anders, East New Market, MD (US); Robert H. Grant, Austin, TX (US); Trudy L. Hewitt, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/809,133

(22) Filed: Nov. 10, 2017

(65) Prior Publication Data

US 2019/0147024 A1    May 16, 2019

(51) Int. Cl.
*G06F 17/24*    (2006.01)
*H04L 29/08*    (2006.01)
(Continued)

(52) U.S. Cl.
CPC .......... *G06F 17/24* (2013.01); *G06F 16/176* (2019.01); *G06F 16/1734* (2019.01);
(Continued)

(58) Field of Classification Search
CPC .... G06F 17/24; G06F 17/2288; G06F 17/241; G06F 17/28; G06F 16/955; G06F 16/176;
(Continued)

(56) References Cited

U.S. PATENT DOCUMENTS

| 7,149,980 B1 | 12/2006 | Nelson et al. |
| 8,468,244 B2 | 6/2013 | Redlich et al. |

(Continued)

OTHER PUBLICATIONS

Chen, "End-User Mapping: Next Generation Request Routing for Content Delivery", SIGCOMM, Aug. 17-21, 2015, London, United Kingdom, 15 pages.

(Continued)

*Primary Examiner* — Tadesse Hailu
(74) *Attorney, Agent, or Firm* — William Hartwell; Andrew D. Wright; Roberts Mlotkowski Safran Cole & Calderon, P.C.

(57) ABSTRACT

Systems and methods for dynamic contribution mapping of digital works are disclosed. In embodiments, a computer-implemented method, comprises: capturing, by a computing device, an IP address of a user signing into a content management system through a user computer device; determining, by the computing device, that the IP address of the user does or does not match existing user profile data in a user profile database; determining, by the computing device, that the user is modifying a portion of a digital work; determining, by the computing device, an engagement context of the user's modification of the digital work using natural language processing; determining, by the computing device, an engagement type of the user based on the engagement context; and mapping, by the computing device, the user profile data of the user and the engagement type with the portion of the digital work.

19 Claims, 5 Drawing Sheets

(51) Int. Cl.
*H04L 29/12* (2006.01)
*G06F 16/176* (2019.01)
*G06F 16/955* (2019.01)
*G06F 16/17* (2019.01)
*G06F 16/9535* (2019.01)
*G06F 16/93* (2019.01)
*G06Q 10/10* (2012.01)
*G06F 17/22* (2006.01)
*G06F 17/28* (2006.01)
*H04L 29/06* (2006.01)
*H04W 4/21* (2018.01)

(52) U.S. Cl.
CPC ............ *G06F 16/93* (2019.01); *G06F 16/955* (2019.01); *G06F 16/9535* (2019.01); *G06F 17/2288* (2013.01); *G06F 17/241* (2013.01); *G06Q 10/101* (2013.01); *H04L 61/2007* (2013.01); *H04L 67/306* (2013.01); *G06F 17/28* (2013.01); *H04L 63/08* (2013.01); *H04W 4/21* (2018.02)

(58) Field of Classification Search
CPC ............... G06F 16/1734; H04L 67/306; H04L 61/2007; G06Q 10/101
See application file for complete search history.

(56) References Cited

U.S. PATENT DOCUMENTS

| | | | |
|---|---|---|---|
| 8,656,181 B2 | 2/2014 | Balinsky et al. | |
| 9,208,153 B1 | 12/2015 | Zaveri et al. | |
| 9,654,549 B2 | 5/2017 | Akkarawittayapoom | |
| 10,162,810 B2 | 12/2018 | Ye et al. | |
| 10,169,311 B2 | 1/2019 | Myers et al. | |
| 2006/0168510 A1* | 7/2006 | Bryar | G06F 17/212 715/229 |
| 2009/0083220 A1 | 3/2009 | Petri | |
| 2010/0100554 A1 | 4/2010 | Carter | |
| 2013/0290516 A1 | 10/2013 | Eaton et al. | |
| 2014/0230076 A1* | 8/2014 | Micucci | G06F 21/6209 726/28 |
| 2015/0100898 A1 | 4/2015 | Jue | |
| 2015/0180846 A1* | 6/2015 | Nguyen | H04L 63/08 726/7 |
| 2015/0222615 A1* | 8/2015 | Allain | H04L 63/08 726/4 |
| 2015/0278168 A1* | 10/2015 | Hawa | G06F 16/275 715/205 |
| 2015/0310188 A1* | 10/2015 | Ford | G06F 21/10 726/28 |
| 2016/0110371 A1 | 4/2016 | Wetherall et al. | |
| 2016/0240026 A1 | 8/2016 | Wise | |
| 2017/0250938 A1* | 8/2017 | Dahl | H04L 51/18 |
| 2018/0189255 A1* | 7/2018 | Kofman | G06F 3/0482 |
| 2018/0191645 A1* | 7/2018 | Cacioppo | H04L 51/04 |
| 2018/0335935 A1* | 11/2018 | Larson | G06F 3/04847 |

OTHER PUBLICATIONS

Anonymous, "Document View Management System Based on Role Model", IP.com, Jan. 22, 2015, 8 pages.
Anonymous, "A system for Differential Phased Content Authoring", IP.com, Dec. 10, 2012, 3 pages.
Specification "Dynamic Contribution Mapping of Digital Works" and drawings in related U.S. Appl. No. 16/562,542, filed Sep. 6, 2019, 40 pages.
List of IBM Patents or Patent Applications Treated as Related, dated Sep. 13, 2019, 1 page.

\* cited by examiner

DYNAMIC CONTRIBUTION MAPPING OF DIGITAL WORKS

BACKGROUND

The present invention relates generally to collaborative content management, and more particularly to dynamic contribution mapping of digital works.

As networking systems have become more sophisticated and prevalent in business environments, a variety of systems have been developed to enable multiple users to contribute to shared digital content. For example, collaborative systems have been developed that allow registered users to contribute digital content in the form of text, images, audio, video, etc. Such systems may record when a registered user is a contributor of particular content within a collaborative work. Additionally, registered users or administrators may manually assign authorship status for a portion of a digital work, or may decide to omit authorship status when they determine that an edit to the digital work should not get an accompanying author citation.

SUMMARY

In an aspect of the invention, a computer-implemented method includes: capturing, by a computing device, an IP address of a user signing into a content management system through a user computer device; determining, by the computing device, that the IP address of the user does or does not match existing user profile data in a user profile database; determining, by the computing device, that the user is modifying a portion of a digital work; determining, by the computing device, an engagement context of the user's modification of the digital work using natural language processing; determining, by the computing device, an engagement type of the user based on the engagement context; and mapping, by the computing device, the user profile data of the user and the engagement type with the portion of the digital work.

In another aspect of the invention, there is a computer program product for dynamic contribution mapping of digital works. The computer program product comprises a computer readable storage medium having program instructions embodied therewith. The program instructions are executable by a computing device to cause the computing device to: capture an IP address of a user signing into a content management system for digital works; determine that the IP address of the user does or does not match existing user profile data in a user profile database; receive a request for a digital work; share the digital work with the user in response to the request; dynamically determine an engagement context of a user engaging a portion of the digital work utilizing natural language processing; determine an engagement type of the user based on the engagement context; and map the user profile data of the user and the engagement type with the portion of the digital work.

In another aspect of the invention, there is a system for dynamic contribution mapping of digital works. The system includes a CPU, a computer readable memory and a computer readable storage medium associated with a computing device. The system also includes: program instructions to receive a request from a user computer device for a digital work; program instructions to share the digital work with the user computer device, wherein the digital work is associated with attribution data listing one or more portions of the digital work attributed to one or more contributors based on stored context data; program instructions to determine that a user is engaging a portion of the digital work; program instructions to determine additional content to provide to the user based on attribution data associated with the portion of the digital work in the stored context data; program instructions to present an option for the additional content to the user computer device; program instructions to receive a selection of the option from the user computer device; and program instructions to share the additional content with the user computer device, wherein the program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
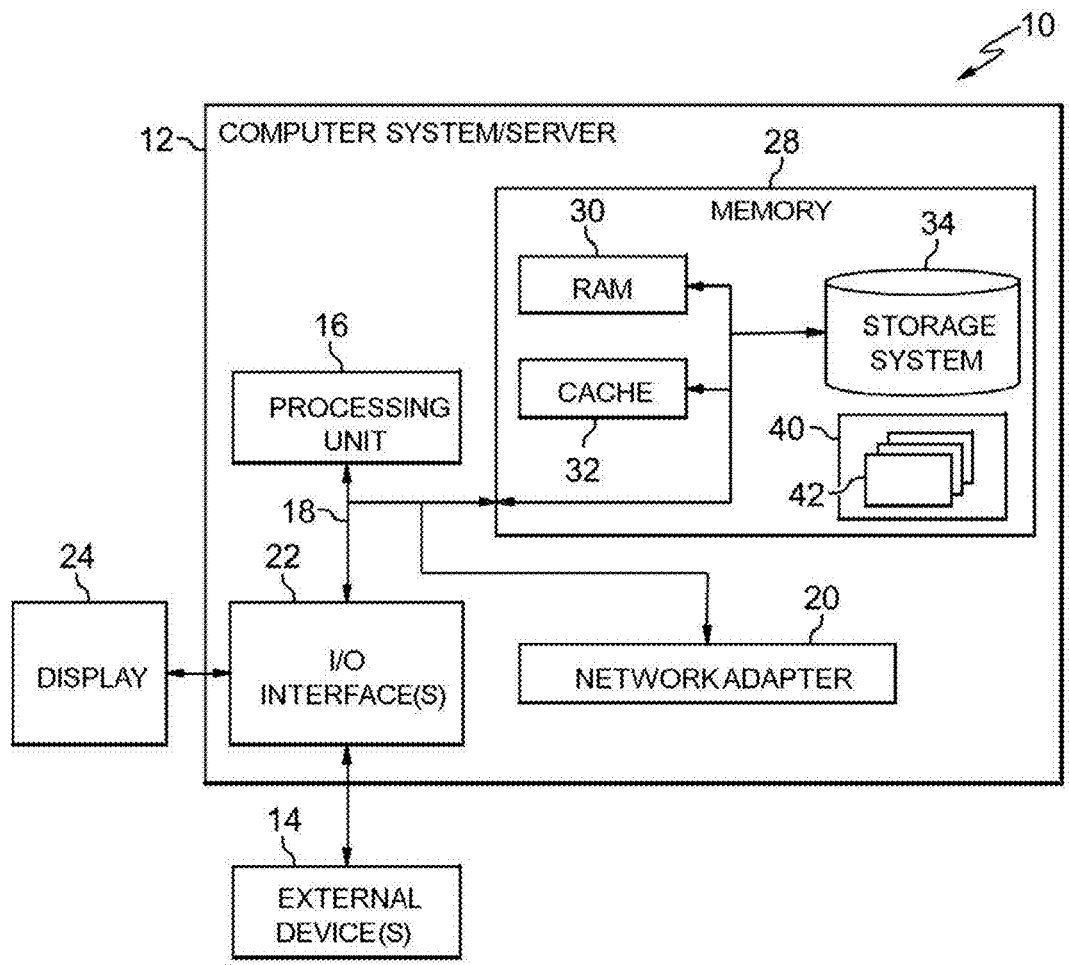
FIG. 1 depicts a computing infrastructure according to an embodiment of the present invention.

The present invention relates generally to collaborative content management, and more particularly to dynamic contribution mapping of digital works. In embodiments, a system of the present invention dynamically determines an author of a shared digital work (e.g., document) based on a user's engagement in the digital work. In aspects, a system is configured to trace through the user's engagements within the digital work, wherein the engagements are associated with one or more IP addresses of the user. In aspects, the IP address(es) of the user may be utilized to confirm the identity of an author, editor or consumer of a digital work. In embodiments, a system of the invention is configured to dynamically visually represent an author's information when a viewer highlights (e.g., hovers over with a mouse, etc.) a portion of the digital work, thus reflecting ownership of the digital work through a user interface (UI).

In aspects of the present invention, when originating text from a first contributor is edited by another user, the system determines when the edits are grammatical or change the meaning. When changes made by the edits are simply grammatical, no credit is given to the user as a second contributor; however, when the changes alter the meaning or add to the value of the text's context, the user's IP address is credited as a second contributor in addition to the first contributor. In aspects, the system is configured to highlight or otherwise indicate which portions of text were contributed by which contributor (e.g., the first contributor or the second contributor).

The present invention constitutes improvements in the technical field of collaborative digital work systems by providing a system and method for determining the engagement context of users with respect to a digital work, and dynamically mapping context data and user credentials to the digital work to automatically provide users with attribution data. Advantageously, embodiments of the present invention address the technical problem of identifying authors of a collaborative digital work, and provides for the dynamic determination of authors, editors and consumers based on their engagement context.

Moreover, embodiments of the present invention enable a content management server to trace through user engagements, associating the originating IP address as well as the current IP address, if different, to confirm a user's respective role and/or identity. Such a system may be configured to enable authors of only approved IP addresses, such as in the case of collaborative work on a highly confidential digital work. Further, embodiments of the present invention enable users to dynamically visualize an author's/editor's information when they engage a portion of a digital work (e.g., text), thus reflecting ownership/engagement in the user interface. Additionally, aspects of the invention enable user notifications specific to a topic/portion of the communication to be sent to a user based on the originator (by IP address), versus sending notifications to all authors of a digital work. Moreover, embodiments of the invention highlight portions of the digital work (e.g., document) that may be of interest to the user or suggest other areas of the digital work that may need engagement in the form of editing or authoring, based on the user's engagement context with the digital work.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
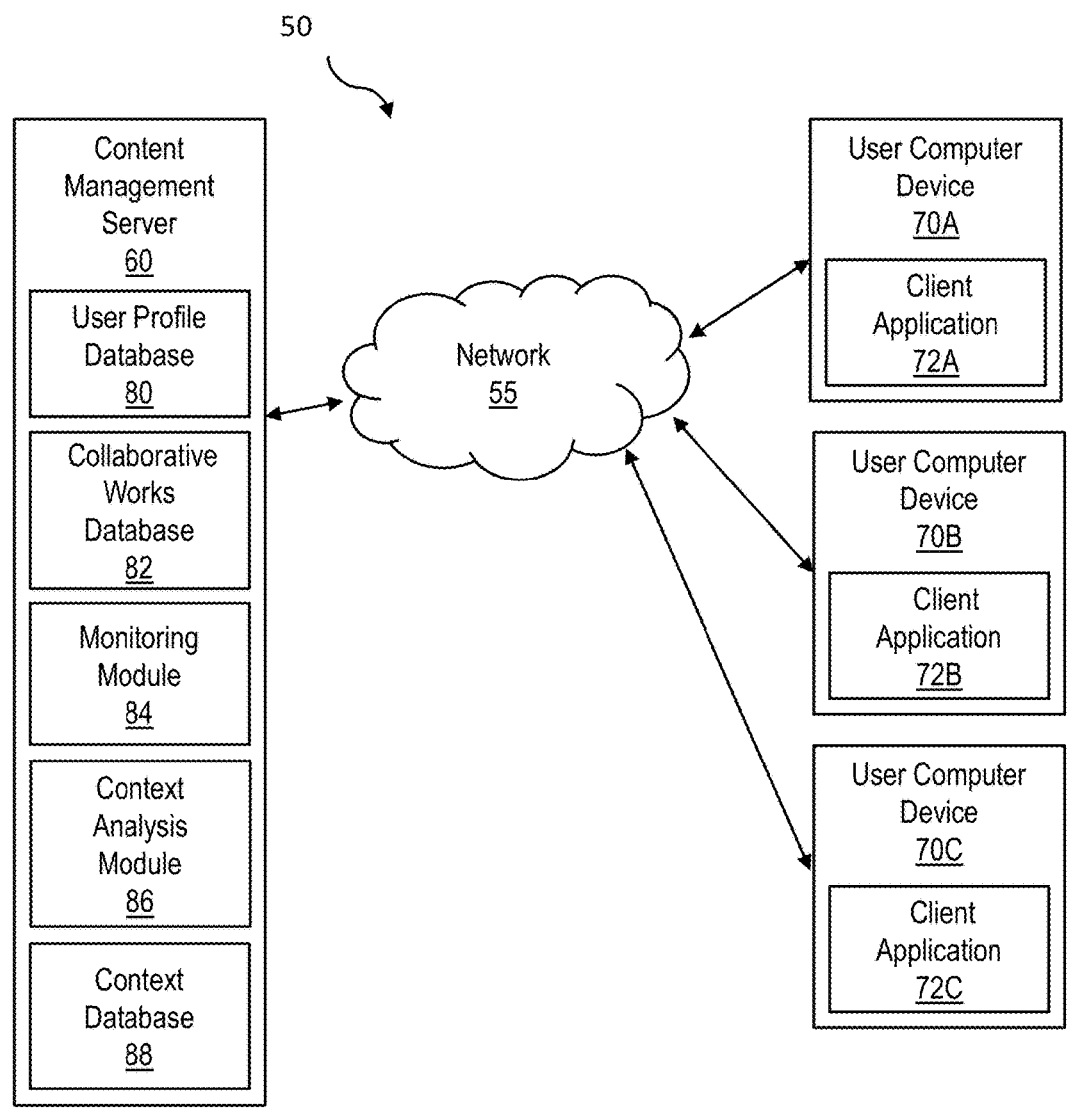
FIG. 2 shows an exemplary environment in accordance with aspects of the invention.

FIG. 2 shows an exemplary content management system 50 in accordance with aspects of the invention which enables file sharing and collaboration among users. The content management system 50 includes a network 55 connecting a content management server 60 with a plurality of user computer devices represented at 70A-70C. The content management server 60 may comprise a computer system 12 of FIG. 1, and may be connected to the network 55 via the network adapter 20 of FIG. 1. The content management server 60 may be configured as a special purpose computing device that is part of the content management system 50. For example, content management server 60 may be configured to manage the collaborative creation and editing of digital works in a networked environment.

The network 55 may be any suitable communication network or combination of networks, such as a local area network (LAN), a general wide area network (WAN), and/or a public network (e.g., the Internet). The user computer devices 70A-70C may be in the form of the computing device 12 of FIG. 1, and may be a desktop computer, laptop computer, tablet computer, smartphone, etc. In embodiments, the user computer devices 70A-70C each run a respective client application 72A-72C that provides an interface by which a user may retrieve, review and modify digital works provided by the content management server 60.

Still referring to FIG. 2, the content management server 60 includes, in embodiments, a user profile database 80 for storing user profile data of a plurality of users, and a collaborative digital works database 82 for storing a plurality of digital works. The term digital works as used herein refers to documents, drawings, photographs, or other types of editable digital works that may be collaboratively reviewed and modified. In embodiments, the collaborative digital works database 82 houses a plurality of text-based digital works, such as word documents, spreadsheets, and the like.

In embodiments, the content management server 60 includes a monitoring module 84 configured to perform one or more functions as described herein. The monitoring module 84 may include one or more program modules (e.g., program module 42 of FIG. 1) executed by the content management server 60. In embodiments, the monitoring module 84 is configured to detect or determine a user's engagement with a digital work. The term engagement as used herein refers to a user's interactions with a digital work, including viewing the digital work, editing the digital work, and adding content to the digital work (e.g., the additional of text, figures, comments, notes, or the like).

In embodiments, the content management server 60 includes a context analysis module 86 configured to perform one or more functions as described herein. The context analysis module 86 may include one or more program modules (e.g., program module 42 of FIG. 1) executed by the content management server 60. In embodiments, the context analysis module 86 is configured to dynamically determine an engagement context of the user's engagement with the digital work, and store the engagement context in a context database 88. The term engagement context as used herein refers to the context in which a user is interacting or engaged with the digital work. For example, a user engaged in modifying a digital work may be either an author of content, or may be an editor of the content, depending on the context of the modifications (e.g., substantive modifications that change the meaning or core idea of a portion of the digital work versus editorial modification that do not change the meaning or core idea of the portion of the digital work).

In embodiments, the content management server 60 may include additional or fewer components than those shown in FIG. 2. In embodiments, separate components may be integrated into a single computing component or module. Additionally, or alternatively, a single component may be implemented as multiple computing components or modules. Moreover, the quantity of devices and/or networks in the content management system 50 is not limited to what is shown in FIG. 2. In practice, the content management system 50 may include additional devices and/or networks; fewer devices and/or networks; different devices and/or networks; or differently arranged devices and/or networks than illustrated in FIG. 2.

Figure 3:
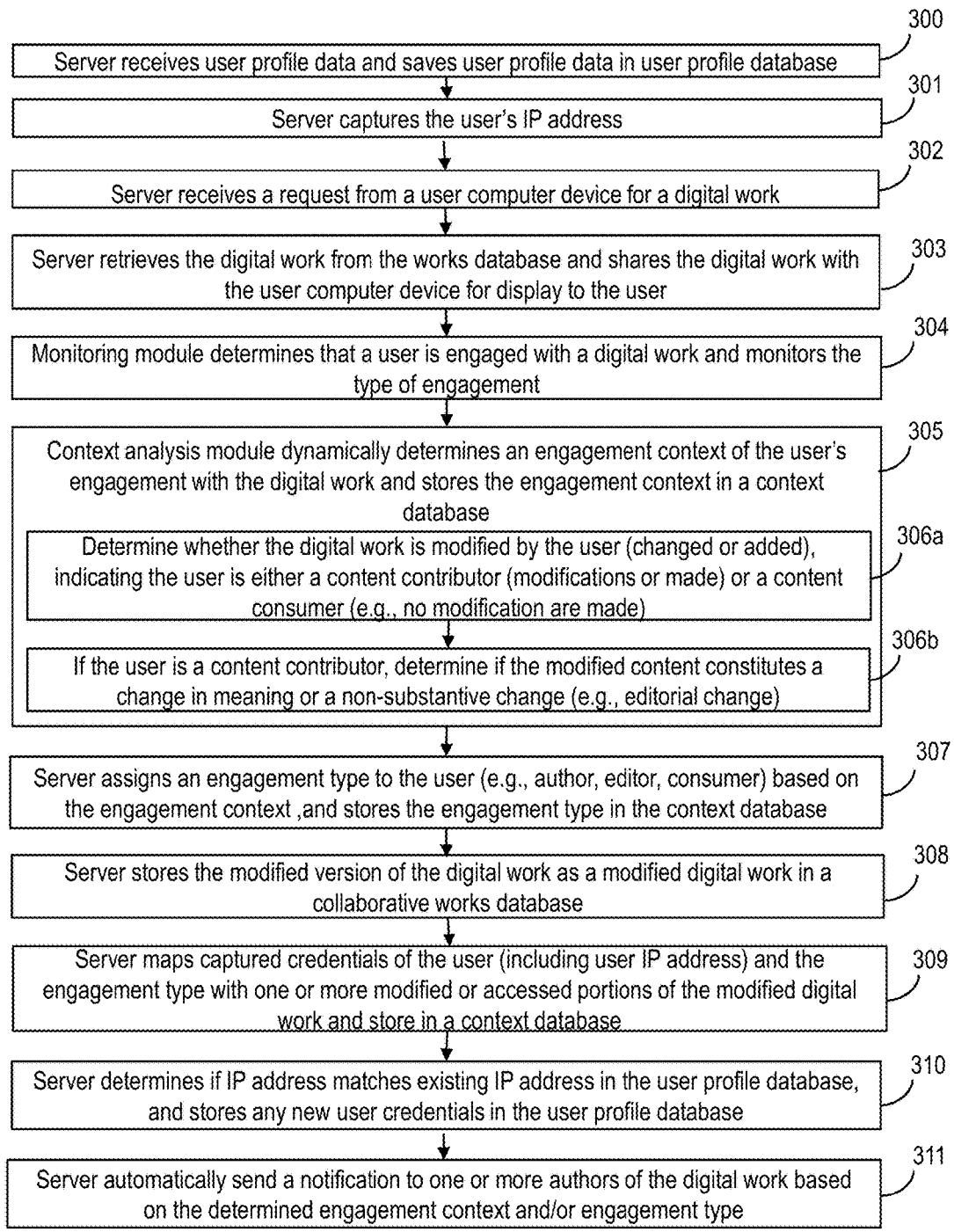
FIG. 3 shows a flowchart of steps of a method in accordance with aspects of the invention.

FIG. 3 shows a flowchart of a method in accordance with aspects of the invention. Steps of the method of FIG. 3 may be performed in the environment illustrated in FIG. 2, and are described with reference to elements shown in FIG. 2.

At step 300, the content management server 60 receives user profile data and saves the user profile data in the user profile database 80. In embodiments, the user profile data includes user data to be displayed to other users, such as credentials (e.g., qualifications, achievements, aspects of the user's personal background, etc.). In aspects, the content management server 60 receives user profile data from a user computer device 70A via the network 55. Alternatively, the content management server 60 may receive user profile data from a third party source (not shown). In embodiments, the content management server 60 receives user profile data during a sign-in process, such as when a user is signing into the content management system 50 through the user computer device 70A.

At step 301, the content management server 60 captures a user's IP address. In embodiments, the content management server 60 captures the IP address of the user computer device 70A when the user is logging into the content management server 60 via the network 55. It should be understood that existing methods for capturing the user's IP address may be utilized by the content management server 60. Moreover, it should be understood that steps 300 and 301 may be performed simultaneously during a login event. In embodiments, the user profile database 80 includes one or more IP addresses already associated with a user. In embodiments, the content management server 60 may compare the captured IP address against existing and/or verified IP addresses in the user profile database 80 in order to verify the identity of a user during the login event. In alternative embodiments, the IP address of the user may be captured when the content management server 60 performs another triggering function, such as when the content management server 60 is saving a modified version of a digital work in accordance with step 310 of FIG. 3, discussed below.

At step 302, the content management server 60 receives a request from a user computer device (e.g., user computer device 70A) for a digital work. It should be understood that conventional methods of communicating requests from a user computer device to the content management server 60 via the network 55 may be utilized in implementing the present invention. For example, the content management server 60 may provide a listing of available digital works and may receive a user's selection of one of the digital works via the client application 72A.

At step 303, the content management server 60 retrieves the digital work requested at step 302 from the collaborative digital works database 82, and shares the digital work with the user computer device 70A for display to the user. Again, it should be understood that conventional methods of sharing documents over a network connection may be utilized in implementing step 304.

At step 304, the monitoring module 84 of the content management server 60 determines that a user in engaged with the digital work of step 303, and monitors the type of engagement of the user. The term engaged as used herein refers to an interaction of the user with the digital work. For example, a user of user computer device 70A may be engaged in modifying a digital work, may be engaged in scrolling through the digital work as they review the digital work, or may be engaged in highlighting or otherwise select different portions of the digital work (e.g., use a mouse to hover over a portion of the digital work), etc. The term "portion" as used herein refers to any part of the digital work (e.g., page(s), paragraph(s), sentence(s)) either engaged by the user, selected by the user, shown on a digital display, or otherwise portioned out of the whole digital work by the content management server 60 during the method steps of FIG. 3. In embodiments, the monitoring module determines that a user has engaged with the digital work upon the user opening the digital work or receiving the digital work. It should be understood that many different engagement types may be determined by the monitoring module, including adding text, removing text, highlighting text, scrolling through text, commenting on portions of the digital work, or other types of interactions.

At step 305, the context analysis module 86 of the content management server 60 dynamically determines an engagement context of the user's engagement with the digital work based on the monitoring of step 304, and stores the engagement context in the context database 88. In embodiments, the context analysis module 86 determines the engagement context of a user's engagement with the digital work in real-time as the user of user computer device 70A is engaging with the digital work. As noted previously, the term engagement context as used herein refers to the context in which a user of the user computer device 70A is interacting or engaged with the digital work. For example, a user engaged in modifying a digital work may be either an author of content, or may be an editor of the content, depending on the context of the modifications (e.g., substantive modifications that change the meaning or core idea of a portion of the digital work versus editorial modification that do not change the meaning or core idea of the portion of the digital work). In embodiments, the context analysis module 86 performs the determination of the engagement context in accordance with substeps 306a and 306b below.

At substep 306a, the context analysis module 86 determines whether the digital work being monitored according to step 304 is being modified by the user (i.e., the digital work contains modified content). In aspects, when the digital work is being modified by the user of the user computer device 70A, the user is considered a content contributor. In contrast, when a user is simply viewing the digital work (e.g., scrolling through the work), the user is considered a content consumer. In accordance with embodiments of the invention, an administrator may choose from various settings of the context analysis module 86 to adjust the engagement activity that results in the user being designated as a content contributor or a content consumer. For example, the context analysis module 86 may present a user with the option to consider the highlighting of text as either a content-contribution activity (whereby the user is designated as a content contributor), or as a content consumer activity (whereby the user is designated as a content consumer).

At substep 306b, when the user is determined to be a content contributor (i.e., the digital work is being modified), the context analysis module 86 determines whether modified content of the digital work constitutes a change in meaning or "core idea" of the portion of the digital work being modified, or is a non-substantive or editorial change. In embodiments, the context analysis module 86 performs substep 306b utilizing natural language processing (NLP). More specifically, the context analysis module 86 may include NLP capabilities or may utilize NLP processes of a remote computer (not shown).

The substantiality of a modification to the digital work may be determined utilizing context analysis tools to determine whether a modification has changed the meaning of the portion of the digital work being modified. In aspects, a context analysis tool may utilize NLP to parse text into different keywords and sentence fragments in order to statistically relate words and/or phrases to certain context or "ideas" and determine whether content changes introduced by a user of the user computer device 70A constitute minor edits that do not change the context or "ideas" associated with the words and/or phrases, or constitute substantive changes to do change the context or "ideas" associated with the words and/or phrases. In embodiments, the context analysis module 86 utilizes NLP to: 1) determine if a modification to the digital work is a correction to a typo or other grammatical correction; 2) determine if the meaning of the digital work or the portion of the digital work being modified has changed; and 3) determine if new content has been added to the digital work that is not merely editorial in nature.

At step 307, the content management server 60 assigns an engagement type to the user based on the engagement context determined at step 305. In aspects, when the meaning of the digital work or the portion of the digital work being modified has changed, or when the user has added content to the digital work that is not merely editorial in nature, then the content management server 60 determines that the user is an author. In aspects, when the meaning of the digital work or the portion of the digital work being modified has not changed, or the content added is merely editorial in nature, the content management server 60 determines that the user is an editor. In aspects, when no modifications were made to the digital work (e.g., a user is simply scrolling through the digital work), the content management server determines that the user is a consumer. While the engagement type of "author", "editor" and "consumer" are utilized herein, it should be understood that other engagement types could be utilized in accordance with the invention.

At step 308, the content management server 60 stores a modified version of the digital work (if any) as a modified digital work in the collaborative digital works database 82. Step 308 may be implemented based on a user-triggered saving event, at predetermined auto-save intervals, or upon a user exiting from the digital content or from the content management system 50, for example. In embodiments, the content management server 60 verifies that the user is authorized to perform authoring or editorial changes (i.e. authorized to contribute content) to the digital work by comparing an authorized list of users with the engagement type of the user assigned at step 307. For example, a user of user computer device 70A may be designated as an "editor only" in their user profile. Accordingly, the content management server 60 may decline to save the modified version of the digital work when modifications to the work are determined to be substantive (e.g., authoring edits), rather than editorial edits, and the user is not authorized to perform substantive modifications to the document. In another example, the content management server 60 may provide the user of user computer device 70A with a warning that they are not authorized to perform substantive modification to the document.

At step 309, the content management server 60 maps user data, including the user's current IP address captured at step 301, and the user's engagement type determined at step 307, to the digital work (e.g., modified digital work) as attribution data, and stores the mapped attribution data in the context database 88. It should be understood that different portions of a digital work may be mapped to different attribution data (e.g., different engagement types of the user), depending on the context of the user's engagement with the particular portion of the digital work. For example, a single user may be designated as an author for a first portion of the modified digital work, but may be designated as an editor for another portion of the modified digital work.

In aspects, a consumer's user data may be mapped to a digital work or portions of a digital work accessed by the user, thus providing a way for administrators to ascertain the popularity of the digital work (i.e., statistical data regarding how many consumers have accessed the digital work or portion of the digital work). In embodiments, the content management server 60 provides a user interface for accessing statistical data associated with multiple consumers' engagement of one or more digital works within the collaborative digital works database 82.

At step 310, the content management server 60 determines whether the IP address captured at step 301 matches an existing IP address in the user profile database 80, and stores any new IP address in the user profile database 80. For example, the content management server 60 may recognize that a user logged into the content management system 50 from a new user computer device 70A, and may save this new IP address with their user data in the user profile database 80. In embodiments, the content management server 60 may perform step 310 upon the content management server 60 storing a modified digital work in the collaborative digital works database 82 in accordance with step 308 of FIG. 3.

In embodiments, at step 311, the content management server 60 automatically sends notification to one or more authors or other designated users when the content management server 60 saves modifications to a digital work. For example, the content management server 60 may automatically send a notification to a user computer device 70B notifying them that a particular portion of a digital work, for which they are listed as an author in the context database 88, has been modified by another user. In aspects, the content management server 60 enables administrators to select notifications settings, including the level of detail in the settings (e.g., the name of the user who performed the modification, the engagement context, the engagement type of the user who performed the modification, credentials of the user who performed the modification, etc.).

It should be understood that the steps of FIG. 3 may be performed simultaneously for different users of the content management system 50 for the same and different digital works. Accordingly, embodiments of the invention may be implemented during a shared document review or editing process in a collaborative work environment.

Figure 4:
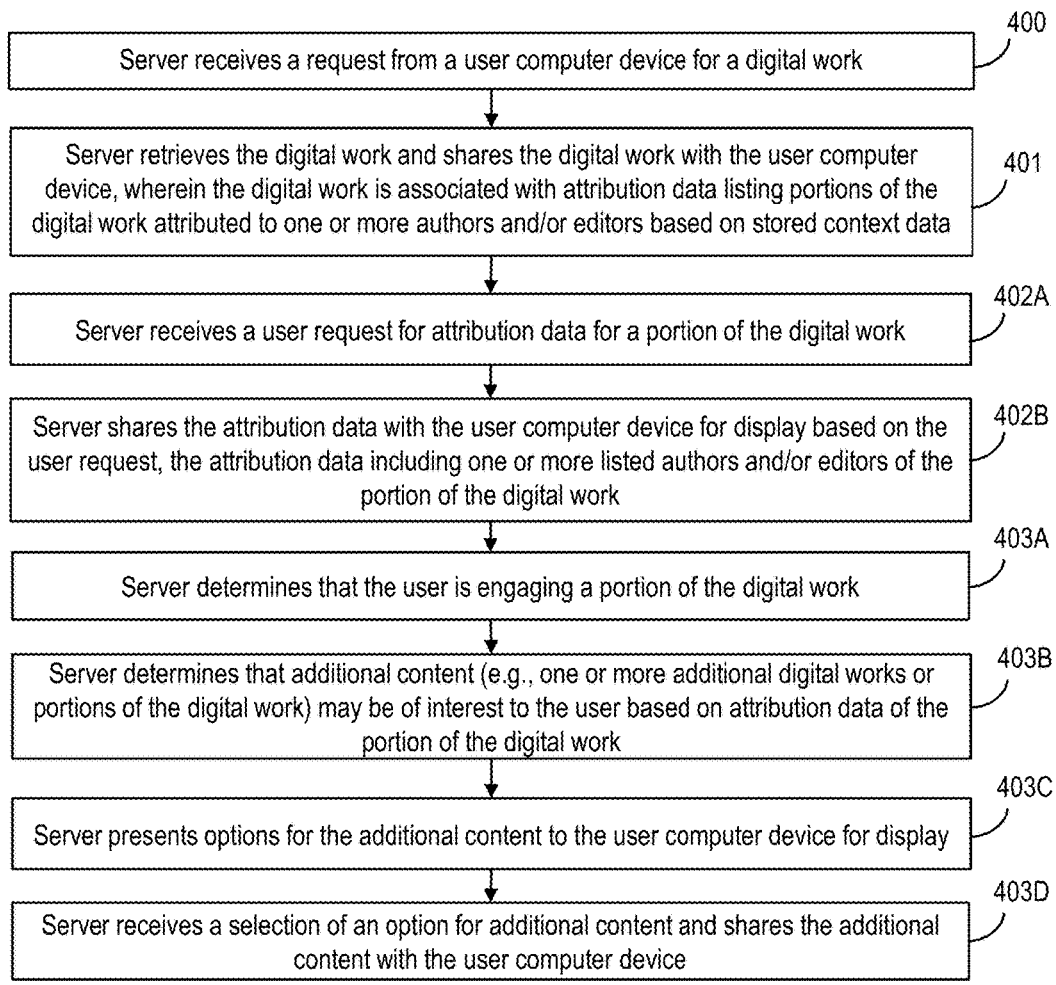
FIG. 4 shows a flowchart of steps of a method in accordance with aspects of the invention.

FIG. 4 shows a flowchart of a method in accordance with aspects of the invention. Steps of the method of FIG. 4 may be performed in the environment illustrated in FIG. 2, and are described with reference to elements shown in FIG. 2.

At step 400, the content management server 60 receives a request from a user computer device (e.g., 70A) for a digital work. In embodiments, the user computer device 70A communicates the request using client application 72A. It should be understood that existing communication methods may be utilized in the performance of step 400.

At step 401, the content management server 60 retrieves the digital work requested at step 400 from the collaborative digital works database 82 and shares the digital work with the requesting user computer device (e.g., 70A), wherein the digital work is associated with attribution data listing one or more portions of the digital work attributed to one or more authors based on context data stored in the context database 88. In embodiments, the digital work is also associated with attribution data listing one or more portion of the digital work attributed to one or more editors based on the context data stored in the context database 88. In aspects, one or more portions of the digital work include a listing of both editors and authors who contributed to the content of the one or more portions.

In embodiments, at step 402A, the content management server 60 receives a user request for attribution data for one or more portions of the digital work from a user computer device (e.g., 70A). In embodiments, the user computer device 70A communicates the request using client application 72A. It should be understood that existing communication methods may be utilized in the performance of step 402A. The user request for attribution data may be triggered by, for example: a user selecting a link requesting the attribution data; by the user hovering over the one or more portions of the digital work with a mouse or otherwise selecting the one or more portions of the digital work; by the user opening the digital work; or by the user utilizing other known methods of selecting text or portions of the digital work.

At step 402B, the content management server 60 shares the attribution data requested at step 402 with the requesting user computer device (e.g., 70A) for display to the user. In aspects, the content management server 60 retrieves the attribution data from the context database 88 before sharing with the user computer device (e.g., 70A). In embodiments, the attribution data includes one or more listed authors or editors associated with the portion of the digital work. In aspects, the attribution data includes data from the user profile database, including credentials of the user and/or contact information (e.g., email address) for the user. The attribution data may include color or other visual indicators to differentiate attribution data. By way of example, author data may be shown in green, while editor data may be shown in red. In embodiments, the attribution data is displayed automatically when the user opens the digital work. In embodiments, the attribution data is in the form of a separate file or document listing paragraphs, pages, and/or sections attributed to a specific author and/or editor.

In embodiments, at step 403A, the content management server 60 determines that a user is engaging a portion of the digital work through the user computer device 70A. Conventional communication methods between a server and networked user computer devices may be utilized in the performance of step 403A. In embodiments, the determination of step 403A is made by the content management server 60 when a user begins to edit content of the digital work; begins adding content to the digital work; begins reading or scrolling through the digital work; highlights the digital work; or otherwise engages one or more portions of the digital work through the user computer device 70A.

In embodiments, at step 403B, the content management server 60 determines that one or more additional digital works or portions of the digital work may be of interest to the user of the user computer device 70A (should be presented to the user) based on the attribution data of the one or more portions engaged by the user at step 403A. In aspects, the content management server 60 may utilize a user's preferences in the user profile database 80 in the determination of step 403B. For example, user profile data of the user may specify that the user is always interested in seeing additional digital works or portions of digital works by a particular author, or may specify that the user is always interested in seeing additional digital works or portions of digital works by the same original author of the portion/digital work with which they are engaged.

In one example, when the content management server 60 determines that a user is editing a portion of the digital work at step 403A, the content management server 60 may determine that the portion of the digital work was previously written by an original author, and that the user may be interested in viewing other portions of the digital work, or additional digital works, that were authored by the same original author. By way of another example, when the content management server 60 determines that a user is viewing a portion of the digital work at step 403A, the content management server 60 may determine that the user is an author of the portion of the digital work, and may determine that the author may be interested in viewing other portions of the digital work for which they are listed as an author in the context database 88.

At step 403C, the content management server 60 presents options for additional content to the user computer device 70A, based on the determination at step 403B. In embodiments, the options are selectable options for retrieving one or more additional digital works, or one or more portions of the digital work engaged at step 403A. In one example, the content management server 60 presents the user with selectable options through the user computer device 70A for a plurality of additional digital works based on the determination at step 403B.

At step 403D, the content management server 60 receives a user selection of an option for the additional content; retrieves the additional content from the collaborative digital works database 82, if necessary; and shares the additional content with the user computer device 70A. In one example, the content management server 60 receives a user selection of an option for an additional digital work, retrieves the additional digital work from the collaborative digital works database 82, and shares the additional work with the user computer device 70A. In another example, the content management server 60 receives a user selection of an option for one or more additional portions of the digital work engaged at step 403A, and shares the additional portions of the digital work with the user computer device 70A via a split screen display, a link to the one or more additional portions of the digital work, or another method of sharing the additional portions of the digital work with the user.

Figure 5:
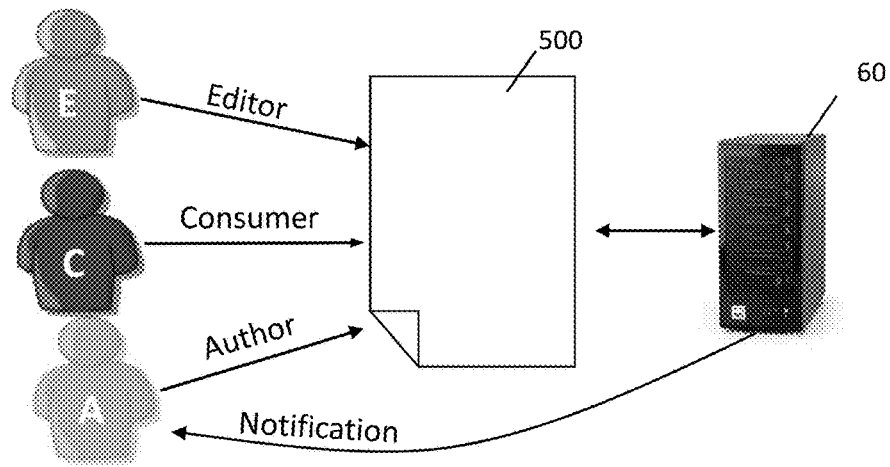
FIG. 5 shows a diagram of a collaborative environment in accordance with aspects of the invention.

FIG. 5 is an illustration of a collaborative environment in accordance with embodiments of the invention. As illustrated in FIG. 5, a plurality of users represented by E (editor), C (consumer) and A (author) can access a digital work 500 that is hosted by the content management server 60. It should be understood that E, C and A are representative of user computer devices (e.g., 70A, 70B and 70C) through which users E, C and A can access the digital work 500). In embodiments, content contributors including authors and editors may access the digital work 500, as well as consumers (readers or viewers) of the digital work. In accordance with step 311 of FIG. 3, the content management server 60 may automatically send a notification to the author A, when the content management server 60 determines that an editor E has edited a portion of the digital work 500 authored by A (e.g., when the content management server 60 determines that the engagement type of the user E is "editor").

Figure 6:
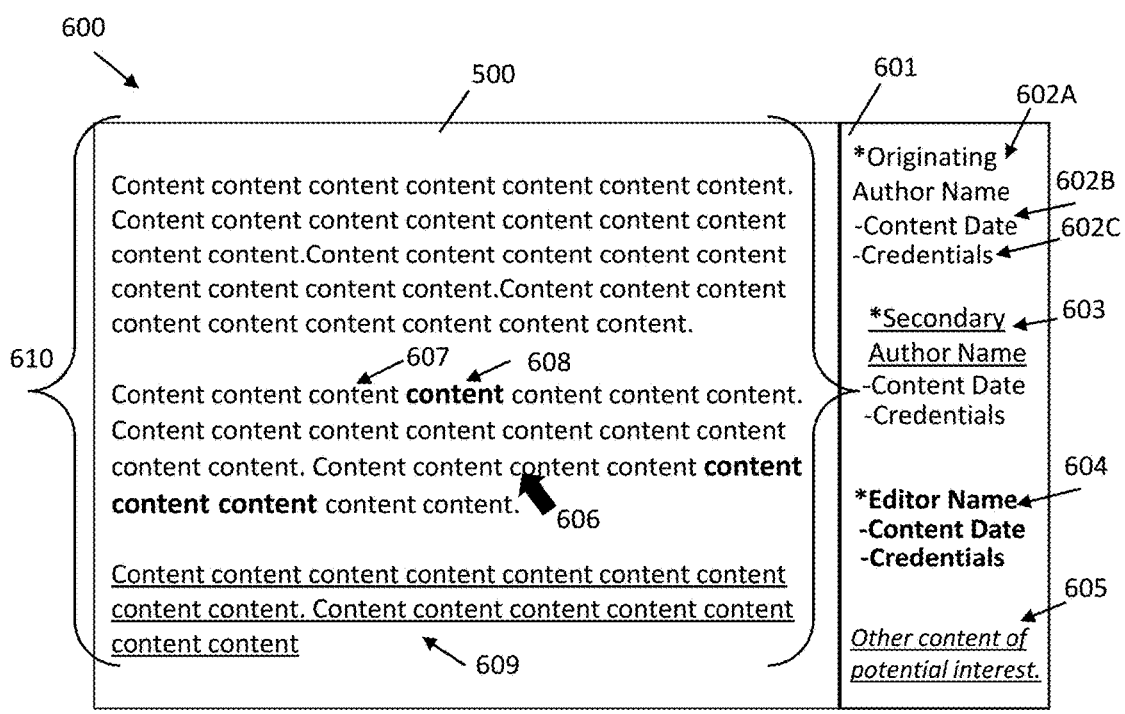
FIG. 6 illustrates a user interface for viewing a digital work in accordance with embodiments of the invention.

FIG. 6 illustrates a user interface for viewing a digital work in accordance with embodiments of the invention, and relates to method steps shown in FIGS. 3 and 4. As illustrated in FIG. 6, in embodiments of the invention, a display 600 viewed by a user of the user computer device 70A may show a digital work 500, as well as an attribution data section 601, in accordance with step 402B of FIG. 4. Although attribution data section 601 is illustrated as a separate portion of the display 600, it should be understood that attribution data section 601 may be in the form of a pop-up window or other display format. Attribution data that may be presented to a user includes originating author name 602A (i.e. the original author of the associated content), content date 602B (e.g., date and time content was contributed or edited), author credentials 602C (i.e., titles, qualifications, etc.), secondary author name 603 (i.e., author subsequent to the originating author of the associated content), and editor name 604.

In aspects, the content management server 60 presents a user with one or more options 605 for additional content that may be of interest to the user, in accordance with step 403C of FIG. 4. A user may utilize a mouse or other selection method represented at 606 to engage one or more portions 606 of the digital work 500 in accordance with step 403A of FIG. 4. In embodiments, the content management server 60 utilizes different colors, styles or other indicators to distinguish content contributed by different users. In the example of FIG. 6, content 607 represents content contributed by the originating author 602A, content 608 represents content contributed by the editor 604, and content 609 represents content contributed by the secondary author 603 in a portion 610 of the digital work 500.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for dynamic contribution mapping of digital works. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
capturing, by a computing device, an IP address of a user signing into a content management system through a user computer device;
determining, by the computing device, that the IP address of the user does or does not match existing user profile data in a user profile database;
determining, by the computing device, that the user is modifying a portion of a digital work;
determining, by the computing device, an engagement context of the user's modification of the digital work using natural language processing, wherein the engagement context is the context in which the user is modifying the digital work, including whether the user's modification constitutes a change in a meaning of a portion of the digital work or a non-substantive change to the portion of the digital;
determining, by the computing device, an engagement type of the user based on the engagement context; and
mapping, by the computing device, the user profile data of the user and the engagement type with the portion of the digital work.

2. The method of claim 1, wherein the determining the engagement type of the user based on the engagement context comprises one of:
determining, by the computing device, that the engagement type of the user is an author when the user's modification constitutes a change in the meaning of the portion of the digital work; and
determining, by the computing device, that the engagement type of the user is an editor when the user's modification constitutes a non-substantive change to the portion of the digital work.

3. The method of claim 1, wherein the determining that the IP address of the user does or does not match existing user profile data in the user profile database comprises determining that the IP address does match existing user profile data in the user profile database.

4. The method of claim 1, wherein:
the determining that the IP address of the user does or does not match the existing user profile data in the user profile database comprises determining that the IP address does not match the existing user profile data in the database and is a new IP address; and
the method further comprises: storing, by the computing device, the new IP address in the user profile database.

5. The method of claim 1, further comprising:
receiving, by the computing device, a user request for attribution data for a portion of the modified digital work; and
sending, by the computing device, the attribution data to the user computer device for display based on the received user request.

6. The method of claim 1, further comprising automatically sending, by the computing device, a notification to one or more authors of the digital work based on the engagement context to notify the one or more authors of the user's modification.

7. The method of claim 1, further comprising:
determining, by the computing device, additional content in a collaborative digital works database to be presented to the user based on attribution data associated with the portion of the digital work;
presenting, by the computing device, an option to the user to view the additional content;
receiving, by the computing device, a selection of the option from the user; and
sharing, by the computing device, the additional content with the user computer device.

8. A computer program product for dynamic contribution mapping of digital works the computer program product comprising a computer readable storage medium having program instructions embodied therewith, the program instructions executable by a computing device to cause the computing device to:
capture an IP address of a user signing into a content management system for digital works;
determine that the IP address of the user does or does not match existing user profile data in a user profile database;
receive a request for a digital work;
share the digital work with the user in response to the request;
dynamically determine an engagement context of a user engaging a portion of the digital work utilizing natural language processing, wherein the engagement context is the context in which the user is engaging the digital work, including whether the user is modifying the digital work in a manner that constitutes: a change in a meaning of a portion of the digital work, or a non-substantive change to the portion of the digital work;
determine an engagement type of the user based on the engagement context; and
map the user profile data of the user and the engagement type with the portion of the digital work.

9. The computer program product of claim 8, wherein:
the determining the engagement context of the user comprises determining that user modifications to the portion of the digital work constitute a change in meaning of the portion of the digital work; and
the determining the engagement type of the user based on the engagement context comprises determining that the engagement type of the user is an author.

10. The computer program product of claim 8, wherein:
the determining the engagement context of the user comprises determining that user modifications to the portion of the digital work constitute a non-substantive change to the portion of the digital work; and
the determining the engagement type of the user based on the engagement context comprises determining that the engagement type of the user is an editor.

11. The computer program product of claim 8, wherein:
the determining an IP address of the credentials of the user does or does not match the existing user profile data in the user profile database comprises determining that the IP address does not match the existing user profile data in the database and is a new IP address; and
the computer program product further causes the computing device to store the new IP address in the user profile database.

12. The computer program product of claim 8, wherein the computer program product further causes the computing device to share the digital work over a network with the user computer device for display, the digital work being associated with attribution data listing one or more portions of the digital work attributed to one or more content contributors to the one or more portions of the digital work.

13. The computer program product of claim 8, wherein the computer program product further causes the computing device to:

receive a user request for attribution data for a portion of the digital work; and send the attribution data to the user computer device for display based on the received user request.

14. The computer program product of claim 8, wherein the computer program product further causes the computing device to automatically send a notification to one or more authors of the digital work based on the engagement context to notify the one or more authors of a modification to the digital work.

15. The computer program product of claim 8, wherein the computer program product further causes the computing device to:

determine additional content in a collaborative digital works database to be presented to the user based on attribution data associated with the portion of the digital work;

present an option to the user to view the additional content;

receive a selection of the option from the user; and share the additional content with the user computer device.

16. The computer program product of claim 8, wherein the computer program product further causes the computing device to verify that the user is authorized to contribute content to the digital work by comparing the IP address of the user and engagement type with a list of authorized IP addresses and associated engagement types.

17. A system for dynamic contribution mapping of digital works, comprising:

a CPU, a computer readable memory and a computer readable storage medium associated with a computing device;

program instructions to receive a request from a user computer device for a digital work;

program instructions to share the digital work with the user computer device, wherein the digital work is associated with attribution data listing one or more portions of the digital work attributed to one or more contributors based on stored context data;

program instructions to determine that a user is engaging a portion of the digital work;

program instructions to determine additional content to provide to the user based on attribution data associated with the portion of the digital work in the stored context data;

program instructions to present an option for the additional content to the user computer device;

program instructions to receive a selection of the option from the user computer device; and program instructions to share the additional content with the user computer device, wherein the program instructions are stored on the computer readable storage medium for execution by the CPU via the computer readable memory.

18. The system of claim 17, further comprising: program instructions to display an attribution section to a user of the user computer device, the attribution section including the attribution data associated with the portion of the digital work.

19. The system of claim 17, wherein the attribution section includes data regarding an original author of content in the portion of the digital work, data regarding a secondary author of content in the portion of the digital work, and data regarding an editor of content in the portion of the digital work.

* * * * *